(12) United States Patent
Parten

(10) Patent No.: US 6,206,349 B1
(45) Date of Patent: Mar. 27, 2001

(54) FLUID-FLUID CONTACTING APPARATUS

(75) Inventor: William David Parten, Middlesbrough (GB)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/066,383

(22) PCT Filed: Oct. 28, 1996

(86) PCT No.: PCT/IB96/01156

§ 371 Date: Apr. 29, 1998

§ 102(e) Date: Apr. 29, 1998

(87) PCT Pub. No.: WO97/16247

PCT Pub. Date: May 9, 1997

(30) Foreign Application Priority Data

Oct. 31, 1995 (GB) .................................................. 9522086

(51) Int. Cl.$^7$ ...................................................... B01F 3/04
(52) U.S. Cl. ................................ 261/112.2; 261/DIG. 72
(58) Field of Search ........................... 261/112.2, DIG. 72

(56) References Cited

U.S. PATENT DOCUMENTS

| | | | |
|---|---|---|---|
| 3,466,151 | 9/1969 | Sicard et al. | 261/112.2 |
| 4,225,540 | 9/1980 | Kauschke . | |
| 4,518,544 | 5/1985 | Carter et al. | 261/112.2 |
| 4,732,713 | 3/1988 | Korsell | 261/112.2 |
| 5,013,492 | 5/1991 | Gay . | |
| 5,167,879 | 12/1992 | Streng | 261/112.2 |
| 5,217,788 | 6/1993 | Rye | 261/112.2 |
| 5,632,934 | 5/1997 | Billingham et al. | 261/112.2 |

FOREIGN PATENT DOCUMENTS

| | | | |
|---|---|---|---|
| 666199 A5 | 7/1988 | (CH) . | |
| 1253673 | 11/1967 | (DE) . | |
| 4122369 C1 | 10/1992 | (DE) . | |
| 0394718 | 10/1990 | (EP) | 261/112.2 |
| 0401682 A1 | 12/1990 | (EP) . | |

OTHER PUBLICATIONS

Patent Abstracts of Japan, vol. 91, No. 011, & JP, A, 06 312101 (Hitachi Ltd.) Nov. 8, 1994, Abstract.

*Primary Examiner*—C. Scott Bushey
(74) *Attorney, Agent, or Firm*—Townsend and Townsend and Crew LLP

(57) ABSTRACT

Fluid—fluid contacting apparatus is provided with a structured packing comprising a series of packing elements fabricated from sheets of crimped material in such a way that the corrugations in each sheet extend obliquely with respect to the direction of bulk fluid flow through the apparatus. Each packing element is oriented with the sheets thereof in a plane which is angularly displaced with respect to the sheets of neighboring elements. A mechanism is provided at or in the vicinity of the interface between neighboring elements for reducing the pressure drop imposed on the continuous phase as it passes from one element to the next.

7 Claims, 4 Drawing Sheets

FLUID-FLUID CONTACTING APPARATUS

BACKGROUND OF THE INVENTION

This invention relates to fluid—fluid contacting apparatus and, in particular, to structured packings for use in such apparatus. Typically apparatus of the type that the invention relates to is used for operations such as distillation, absorption, scrubbing, stripping, heat exchange etc. in which one fluid (e.g. a liquid) is brought into contact with another fluid (e.g. a gas) with the fluids usually flowing countercurrent relative to each other. In the case of gas (or vapor)/liquid contacting, the gas constitutes the continuous phase.

The invention is especially concerned with fluid—fluid contacting apparatus in which the structured packing comprises a number of packing elements arranged in succession in the direction of fluid flow through the apparatus which is usually in the form of a vertically disposed column or tower. Each packing element comprises a plurality of crimped sheets of material arranged in face-to-face relationship with rectilinear corrugations extending obliquely relative to the direction of fluid flow and successive elements are arranged with the sheets in one element angularly displaced with respect to the sheets of the adjacent element(s). Vendors of commercially available packings of this type recommend angular displacements of 90° (Sulzer Brothers Limited) and 70° (Norton Chemical Company).

In their range of packings, one supplier (Sulzer) produces an 'X' range of packings and a 'Y' range of packings. The sheet materials used in the two forms of packings are believed to be identical with respect to surface area and surface treatment but differ by the angle of crimp. In the 'Y' series of packings, the crimp angle is 45° to the horizontal whereas the 'X' series have a crimp angle at 60° to the horizontal.

The 'Y' series packing elements have a higher efficiency but lower capacity than the 'X' series packing elements. The efficiency of a structured packing is a property of the way vapor and liquid contact each other over the whole surface of the packing. The capacity of the packing is set by the capacity at its most restricted elevation. The 'X' series packing elements impose a smaller change in direction on the fluids at the interface due to the larger angle subtended to the horizontal by the crimp angle and therefore have a larger capacity than the equivalent 'Y' series packing elements. The pressure drop within the 'Y' series packing elements is greater and the use of the surface area for mass transfer is greater, hence the 'Y' series packing elements have a higher efficiency.

SUMMARY OF THE INVENTION

Recent indications suggest that the capacity of a structured packing is governed by the behavior of the fluids at the interface between successive packing elements. For instance, where liquid-vapor contact is involved, the pressure drop in the vapor phase is higher at the interface between successive packing elements where the liquid and vapor are forced to move through a change in direction, than in the body of each packing element and, as a result, liquid tends to build-up at the interface. The build up of liquid occurs over a greater range of the operating conditions the higher the liquid load. It is therefore assumed that the widely recognized effect of loss of performance in structured packing at higher pressure is due to a build up of liquid at the interfaces between successive packing elements leading to maldistribution of the liquid into the next packing element in the direction of liquid flow.

According to one aspect of the present invention there is provided fluid—fluid contacting apparatus in which the structured packing comprises a number of packing elements arranged in succession in the designed direction of fluid flow, each packing element comprising a plurality of crimped sheets of material arranged in face-to-face relationship with the corrugations extending obliquely relative to the direction of fluid flow, successive elements being arranged with the sheets in one element angularly-displaced with respect to the sheets of the adjacent element(s), characterized by the provision of means at or in the vicinity of the interface between successive elements for reducing the pressure drop imposed on the continuous phase at the interface.

In this manner, it is possible to secure good efficiency without unduly sacrificing capacity (and vice versa). Said means may have the effect of generally smoothing the rate of change of pressure throughout the packed section of the apparatus without necessarily reducing the overall pressure drop across the packed section (although such overall pressure drop may occur). In particular, said means serves to reduce the rate of change of pressure at and in the immediate vicinity of said interfaces.

Such means may be implemented by configuring the corrugations in the sheets so as to secure reduced pressure drop.

In one embodiment, instead of employing rectilinear corrugations, at least some (preferably the majority if not all) of the sheets of each packing element have at least some (preferably the majority if not all) corrugations whose angle of obliquity varies between opposite faces of the packing element such that the angle of obliquity is greater in the vicinity of at least one (preferably both) of said faces than the greatest angle of obliquity within the body of the packing element.

By "angle of obliquity" at a particular point along the length of a corrugation, we mean the angle between the axis of the corrugation at that point and a plane containing said point and parallel to said opposite faces.

Thus, in a typical implementation of this embodiment, each sheet of a packing element may be provided with corrugations which impart a change in flow direction as fluid flows through the body of the packing element from one face to the opposite face, the corrugations having a terminal portion or portions (depending on whether the particular corrugation extends to one or both of said opposite faces) which intersect said faces at an angle of up to 90° while the intermediate portions of each corrugation over at least part of the length thereof extend at an angle somewhat less, e.g. typically less than 60°.

The angle of obliquity of each such corrugation preferably changes progressively in the lengthwise direction although we do not exclude the possibility of the change being of a discontinuous nature.

By imparting a variable angle of obliquity to the sheets of the packing elements, mass transfer within the heart of each packing element can be maximized and the use of a higher angle of obliquity in the vicinity of the packing element avoids an extreme change in direction as the fluids pass from one packing element to the next.

In another embodiment of the invention, said means at or in the vicinity of the interface between successive elements for reducing pressure drop at the interface may be implemented by producing at least some (preferably the majority if not all) of the corrugations in at least some (preferably the majority if not all) of the sheets of each packing element with a reduced cross-section in the vicinity of a least one (preferably both) of the faces of the packing element thereby reducing the surface area and pressure drop at such location.

The localized reduction in cross-sectional area of the corrugations may be effected by a reduction in depth. The reduction in depth is preferably progressive as the corrugations approach the end faces of the packing elements.

If desired, such localized reduction in the cross-sectional area of the corrugations may be combined with variation in the angle of obliquity as described above or the reduction may be employed with corrugations which are otherwise of conventional configuration. The reduction in cross-sectional area or depth may take place progressively and may be to such an extent that the corrugations terminate short of the edges proper of the sheets, i.e. so that marginal edges of the sheets are flat (non-corrugated). Because a reduction in depth will result in the sheets being out of contact with one another, if desired or necessary, means may be provided for supporting the sheets in spaced relation with each other and/or increasing the rigidity of the structure in the regions where the depth of the corrugations is reduced. Such means may comprise spacer elements extending between adjacent sheets or the sheets may be provided with formations along those edges which border the interfaces between adjacent packing elements, which formations may be designed to co-operate (e.g. interdigitate) at the interface to maintain sheet spacing and/or enhance rigidity.

In yet another embodiment of the invention, said means at or in the vicinity of the interface between successive elements for reducing pressure drop at the interface may be implemented by provision of fluid flow control means between successive packing elements whereby the localized direction of flow of fluid leaving one packing element is rendered more compatible with the next packing element so as to reduce the pressure drop.

In this instance, the successive packing elements are spaced apart from one another in the direction of bulk fluid flow through the apparatus and the fluid flow control means is located in the gap. Such control means may comprise an open structure having a series of walls which extend between successive packing elements and which may for instance be generally parallel with one another and/or be arranged in two sets with one set of walls intersecting the other. Thus, for example, the control means may comprise an open grid structure having cells through which fluid exiting one packing element passes before entering the next packing element, the cells having axes which are substantially parallel to the direction of bulk flow of fluid through the apparatus or at least more closely in parallel with direction of said bulk flow than said corrugations. Alternatively the control means may comprise an arrangement of regularly or irregularly 'shaped objects, such as Raschig and/or Pall rings, preferably oriented with the major part of their surface areas extending predominantly in the direction of said direction of bulk flow so that the fluid passing from one packing element to the next has a flow direction which is predominantly parallel with said direction of bulk flow.

In a further embodiment of the invention, said means at or in the vicinity of the interface between successive elements for reducing pressure drop at the interface may be implemented by provision of a gap between successive packing elements. In this embodiment, the packing elements may be supported in spaced relation with a gap therebetween sufficient to secure a significant reduction in the pressure drop imposed on the continuous phase as it passes from one packing element to the next. Preferably the gap, i.e. the perpendicular distance between planes containing the extremities of successive packing elements at each interface, is at least 2 cm, more usually at least 4 cm. Where the packing elements are separated from one another in this way, without any intervening structure such as a support grid between them, it may be desirable to control the descending liquid phase so as to promote efficient transfer from one packing element to the packing element below. Otherwise there may be a tendency for the liquid phase to run along the sheet edges at the interface with the possibility of maldistribution. For instance, the sheet edges at the lower faces of the packing elements may be contoured to promote collection of the liquid at well-defined sites so that the liquid phase then drips from these sites onto the packing element below. Thus, for example, the sheet edges at the lower faces may have a zigzag configuration so that the liquid phase collects, and drips, from the apices. It will be appreciated that the zigzag configuration will be such that a large number of drip sites are distributed substantially uniformly across the interface.

The materials of fabrication of the sheets may be selected from those usually employed in structured packing, e.g. thin foil-like materials (metal or otherwise), gauze materials, etc. The sheets may be perforated to allow passage of fluid from one side of the sheet to the other as the fluids flow through the packing.

The surface of the sheet material may be smooth or it may be textured by any appropriate technique to improve its wetting, liquid distribution and cross-mixing properties for example.

The profile of the corrugations in cross-section may take various forms commonly used in structured packings, e.g. semi-circular, V-shaped, etc. Likewise, the dimensions of the corrugations may be generally the same as used in commercially available structured packing such as sold by Sulzer and Norton Chemical Company. The corrugations need not necessarily be continuous throughout the packing element. For instance, as used in a commercially available structured packing, the corrugations may be interrupted within the body of the packing element for example in such a way that a first series of corrugations extend part-way through the element and a second series of corrugations then succeed said first series and extend through the remainder of the element, the peaks and troughs of the first series being laterally offset relative to those of the second series and apertures being formed in the sheets at the junctions between the two series whereby fluids can pass from one side of the sheet to the other.

Mass transfer at the interfaces may be reduced at the interfaces between packing elements in accordance with the present invention. Consequently the depth dimension (as considered in the direction of bulk flow through the apparatus) of a packing element in accordance with the invention when optimized with respect to efficiency may differ from that of (and typically be greater than) a conventional structured packing element having the same efficiency.

DESCRIPTION OF THE PREFERRED EMBODIMENTS

Figure 1:
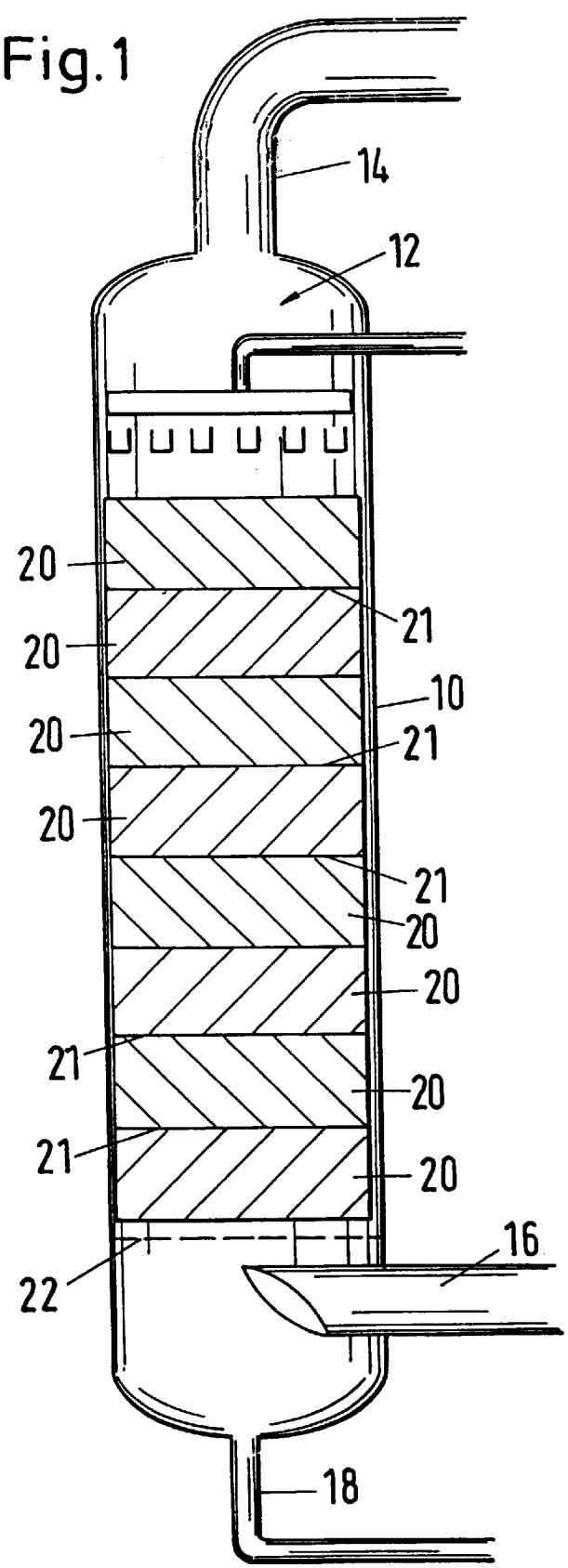
FIG. 1 is a diagrammatic view of a packed column.

Referring to FIG. 1, the invention will be decribed with reference to a packed column or tower 10 for use in for example mass transfer or heat exchange between a descending liquid phase and an ascending vapor phase. At its upper end, the column 10 is provided a liquid distributor 12 and a vapor outlet 14. At its lower end, the column is provided with a vapor inlet 16 and a liquid outlet 18. A number of structured packing elements 20 and stacked vertically above a support 22. Each packing element comprises a series of parallel sheets or lamellae arranged in planes extending substantially vertically with the sheets in each packing element disposed at an angle to those in the adjacent packing element(s). This angle may be 90° for instance but other angles are possible. The packing elements are fabricated so that they extend across substantially the full width of the column and are of a convenient depth for installation, typically 30 cm deep. Each packing element in the embodiment of FIG. 1 is located in abutting relation with its neighbors with interfaces 21 between them.

Figure 2:
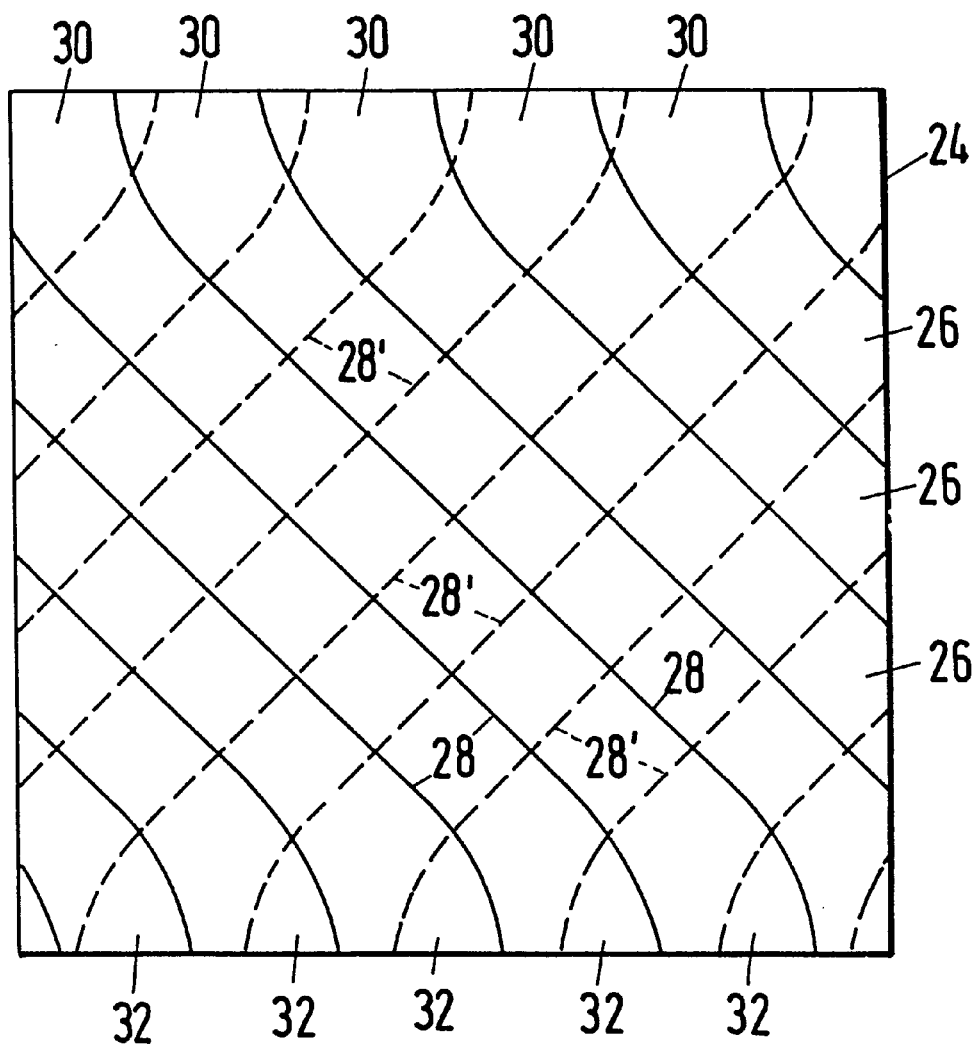
FIG. 2 is a fragmentary view of a packing element schematically showing the configuration of the corrugations in adjacent sheets.

Referring to FIG. 2, each sheet or lamella 24 is formed with a series of corrugations 26 with peaks or crests 28 extending generally obliquely between the upper and lower faces of the respective packing element and adjacent sheets are oriented with the corrugations thereof intersecting in crisscross fashion. Adjacent sheets contact each other at the points of intersection between the peaks of one sheet and those of the neighboring sheets. In contrast with commercially available structured packings, the corrugations are not rectilinear along their entire length—instead each corrugation 26 has a terminal portion or portions 30, 32 (depending on whether it extends to just one or both of the upper and lower faces of the packing element) disposed at a different angle to the intermediate portion of the corrugation. As shown the corrugations 26 change direction progressively between the upper and lower faces of the packing elements such that the terminal portions 30, 32 have axes which are substantially perpendicular to those faces while the intermediate portions are inclined to the vertical. In FIG. 2, the solid lines depict the peaks 28 of the corrugations in the face of the sheet presented to the viewer while the broken outlines 28' depict the peaks of the corrugations in the corresponding face of the sheet immediately behind the one in view. Although in FIG. 2, the terminal portions 30,32 of the corrugations intersect the upper and lower faces substantially perpendicularly, it will be understood that the advantages of the invention may still be secured even if the angle of intersection is less than 90°.

Figure 3:
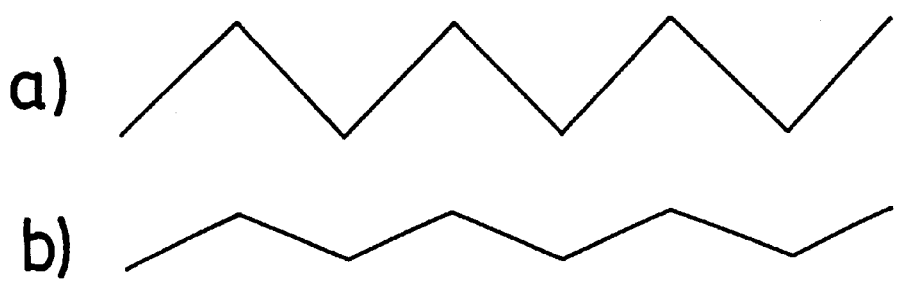
FIG. 3 is a fragmentary view showing (a) the corrugation profile at a location inwardly removed from the interface between adjacent packing elements, and (b) the corrugation profile at a location immediately adjacent the interface.

Referring to FIG. 3, in this embodiment the corrugations may be oriented generally as shown in FIG. 2 or they may be of the rectilinear configuration used in commercially available structured packing such as the 'X' or 'Y' series packing elements manufactured and sold by Sulzer Brothers Limited. Reduced pressure drop is secured or enhanced in this case by reducing the depth of the corrugations in the vicinity of the interfaces 21 of the packing elements (see FIG. 1). Thus, the profile shown at (a) in FIG. 3 represents the corrugation shape at locations inwardly removed from the interfaces 21 of the packing element while the profile shown at (b) represents a reduced depth corrugation shape at or immediately adjacent the interfaces 21. It will be understood that the reduction in depth will mean that the adjacent sheets will no longer have peak-to-peak contact with one another in these regions. If necessary, spacers or the like (not shown) may be provided to maintain uniform spacing between the sheets and/or enhance rigidity of the structure where peak to peak contact does not exist.

Figure 4:
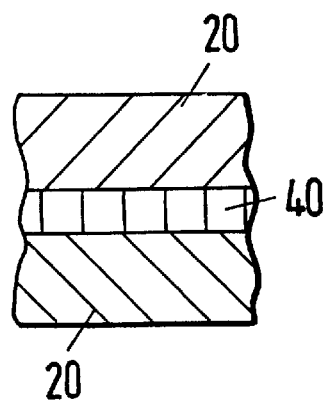
FIG. 4 is a fragmentary view showing an alternative embodiment.

In the embodiment of FIG. 1, the structured packing elements 20 are vertically stacked in abutting face-to-face relation. However, as indicated in FIG. 4, the packing elements 20 (which may comprise commercially available elements such as those described previously) are arranged in vertically spaced relation to reduce pressure drop between successive packing elements, and fluid control means 40 are located between successive packing elements in order to render the fluid flow from one packing element more compatible with the orientation of the next packing element. The fluid control means may as shown be in the form of an open grid structure with the cells of the grid having walls whose surfaces lie in substantially vertically extending planes so that liquid and vapor exiting one packing element at an angle imposed by the obliquely extending corrugations is constrained to pass through the grid structure before entering the next packing element. In this way, the angle of exit flow is modified so as to be substantially vertical before the liquid and vapor enters the differently orientated corrugations of the next packing element. Although not shown in this way, the corrugations in the packing elements and the grids may be so arranged that the cells in the grids effectively form continuations of the corrugations and serve to smoothly deflect flow of the continuous phase from one packing element towards a flow direction corresponding to the orientation of the corrugations in the next packing element.

Although the invention is described with reference to vapor-liquid contacting, we do not exclude the possibility of other forms of fluid—fluid contact, particularly liquid-liquid contact where one liquid, usually the less dense liquid, forms the continuous phase.

Figure 5:
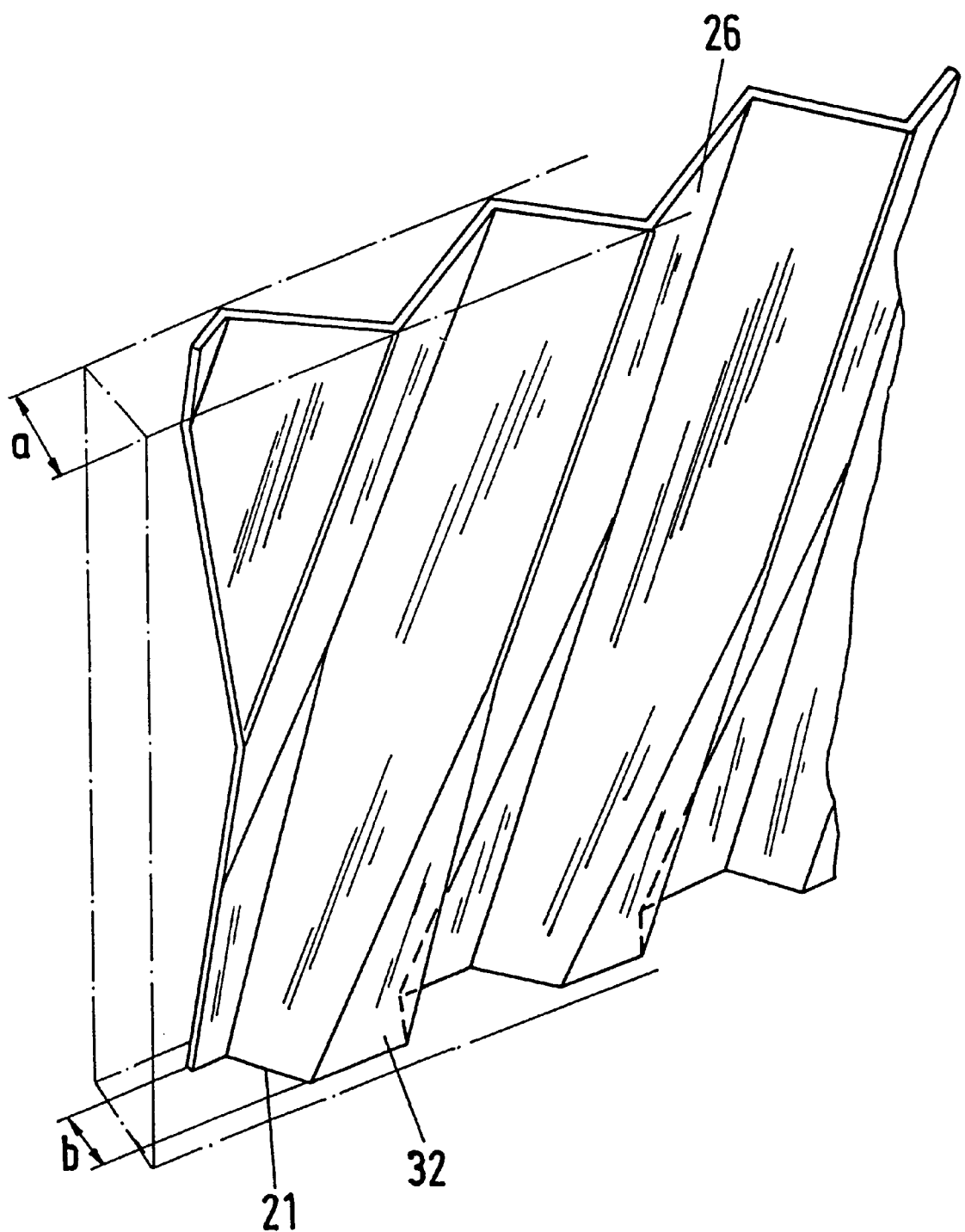
FIG. 5 is a fragmentary view showing an embodiment corresponding to the embodiment of FIG. 3.

Corresponding to FIG. 3, FIG. 5 shows an embodiment with rectilinear corrugations 26 and terminal portions 32 adjacent the interface 21 with reduced depth corrugation shape. The depth of the corrugations 26 is a, the reduced depth at the interface 21 is b. At any height of the terminal portions 32, the total length of the crimped sheet (e.g. the length of unwinding of any horizontal intersection line) is equal to the corresponding length of the corrugations 26.

Figure 6:
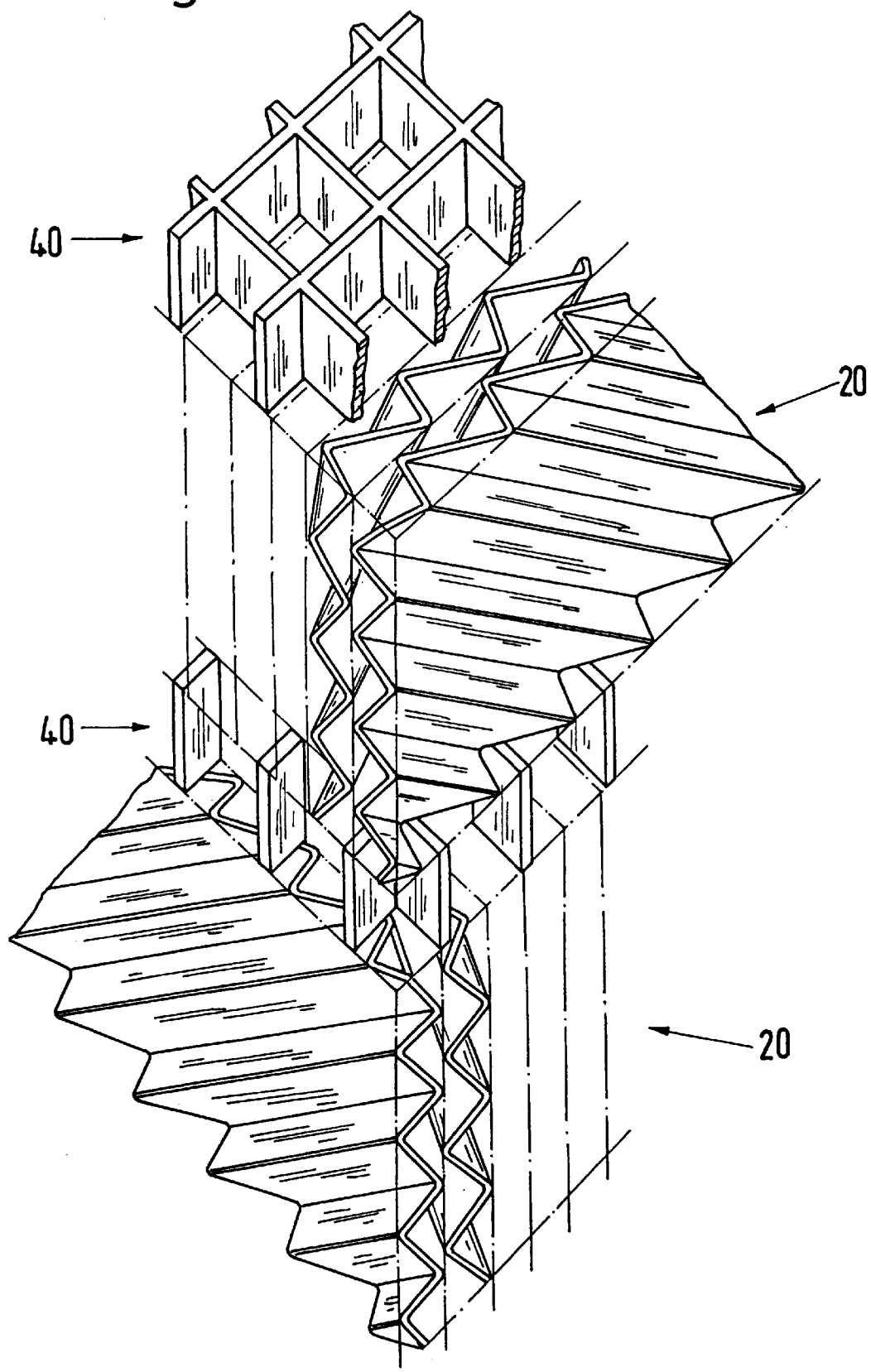
FIG. 6 is a fragmentary view showing an embodiment corresponding to the embodiment of FIG. 4.

Corresponding to FIG. 4, FIG. 6 shows an embodiment with fluid control means 40 located between successive packing elements 20 in form of a grid. The square-shaped cells form a continuation of the corrugations.

What is claimed is:

1. A fluid—fluid contacting apparatus having a structured packing comprising:

a plurality of packing elements arranged in succession in a designed direction of fluid flow, each packing element including a plurality of crimped sheets of material arranged in face-to-face relationship with corrugations extending obliquely relative to the direction of fluid flow, successive packing elements being arranged with the crimped sheets in one packing element angularly displaced with respect to the crimped sheets of adjacent packing elements; and means for reducing pressure drop imposed on a continuous phase at each interface between successive packing elements, the means being arranged at or in vicinity of the interface, wherein the means is constituted by a localized change in configuration of the corrugations immediately adjacent the interface, wherein at least some of the crimped sheets of each packing element have at least some corrugations with a crimp angle extended to the interface, the crimp angle varying progressively in vicinity of at least one of the interfaces, wherein the crimp angle within the body of the packing element in an intermediate portion is substantially a constant and the progressively varying crimp angle is greater than the constant.

2. The apparatus as claimed in claim 1 wherein the corrugations each have terminal portion or portions which intersect the interfaces at an angle of up to 90°.

3. The apparatus as claimed in claim 2 wherein the corrugations change direction progressively between the interfaces of the packing elements so that intermediate portions of the corrugations between the terminal portions are inclined relative to the direction of fluid flow.

4. The apparatus as claimed in claim 1 wherein at least some of the corrugations in at least some of the crimped sheets of each packing element are formed with a reduced cross-section in vicinity of at least one of the interfaces, thereby reducing the surface area and pressure drop at a location of the reduced cross-section.

5. The apparatus as claimed in claim 4 wherein at least some of the corrugations have a localized reduction in depth in vicinity of at least one of the interfaces.

6. The apparatus as claimed in claim 1 wherein the means comprises fluid flow control means at or in vicinity of the interface between successive packing elements for reducing pressure drop at the interface.

7. The apparatus as claimed in claim 6 wherein the successive packing elements are spaced apart from one another by a gap in the direction of bulk fluid flow through the apparatus, and the fluid flow control means is located in the gap.

* * * * *

(12) EX PARTE REEXAMINATION CERTIFICATE (8621st)
United States Patent
Parten

(10) Number: US 6,206,349 C1
(45) Certificate Issued: Oct. 11, 2011

(54) FLUID-FLUID CONTACTING APPARATUS

(75) Inventor: William David Parten, Middlesbrough (GB)

(73) Assignee: Sulzer Chemtech AG, Winterthur (CH)

Reexamination Request:
No. 90/009,751, May 21, 2010

Reexamination Certificate for:
Patent No.: 6,206,349
Issued: Mar. 27, 2001
Appl. No.: 09/066,383
Filed: Apr. 29, 1998

(22) PCT Filed: Oct. 28, 1996
(86) PCT No.: PCT/IB96/01156
§ 371 (c)(1),
(2), (4) Date: Apr. 29, 1998
(87) PCT Pub. No.: WO97/16247
PCT Pub. Date: May 9, 1997

(51) Int. Cl.
*B01J 19/32* (2006.01)

(52) U.S. Cl. ............... 261/112.2; 261/DIG. 72
(58) Field of Classification Search .............. None
See application file for complete search history.

(56) References Cited

U.S. PATENT DOCUMENTS

| | | |
|---|---|---|
| 3,132,190 A | 5/1964 | Engalitcheff, Jr. |
| 4,240,814 A | 12/1980 | Regehr et al. |
| 4,518,544 A | 5/1985 | Carter et al. |
| 4,732,713 A | 3/1988 | Korsell |
| 5,124,086 A | 6/1992 | Schultz |
| 5,124,087 A | 6/1992 | Bradley et al. |
| 5,217,788 A | 6/1993 | Rye |
| 5,413,872 A | 5/1995 | Faigle |
| 5,632,934 A | 5/1997 | Billingham et al. |

FOREIGN PATENT DOCUMENTS

| | | |
|---|---|---|
| DE | 29 21 270 A1 | 5/1979 |
| DE | 29 42 843 A1 | 10/1979 |
| DE | 41 22 369 C1 | 7/1991 |
| EP | 0209898 B1 | 1/1987 |
| EP | 0 554 471 A1 | 2/1992 |
| EP | 0 707 885 A1 | 4/1996 |
| EP | 0 858 366 B1 | 7/2000 |
| SU | 700773 | 11/1979 |

*Primary Examiner*—Elizabeth McKane

(57) ABSTRACT

Fluid-fluid contacting apparatus is provided with a structured packing comprising a series of packing elements fabricated from sheets of crimped material in such a way that the corrugations in each sheet extend obliquely with respect to the direction of bulk fluid flow through the apparatus. Each packing element is oriented with the sheets thereof in a plane which is angularly displaced with respect to the sheets of neighboring elements. A mechanism is provided at or in the vicinity of the interface between neighboring elements for reducing the pressure drop imposed on the continuous phase as it passes from one element to the next.

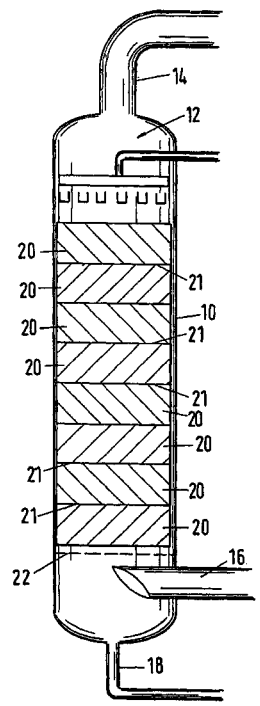

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-7, dependent on an amended claim, are determined to be patentable.

1. A fluid-fluid contacting apparatus having a structured packing comprising:
    a plurality of packing elements arranged in succession in a designed direction of fluid flow, each packing element including a plurality of crimped sheets of material arranged in face-to-face relationship with corrugations extending obliquely relative to the direction of fluid flow, successive packing elements being arranged with the crimped sheets in one packing element angularly displaced with respect to the crimped sheets of adjacent packing elements; and
    means for reducing pressure drop imposed on a continuous phase at each interface between successive packing elements, the means being arranged at or in vicinity of the interface,
    wherein the means is constituted by a localized change in configuration of the corrugations immediately adjacent the interface, wherein at least some of the crimped sheets of each packing element have at least some corrugations with a crimp angle extended to the interface, the crimp angle varying progressively in vicinity of at least one of the interfaces, wherein the crimp angle within the body of the packing element in an intermediate portion is substantially a constant and the progressively varying crimp angle is greater than the constant *and varies progressively from the end of the intermediate portion continuously to the interface.*

\* \* \* \* \*